H. KUXMANN.
AUTOMATIC FOOD AND WATER SUPPLY.
APPLICATION FILED OCT. 28, 1912.
1,207,938.
Patented Dec. 12, 1916.
2 SHEETS—SHEET 1.
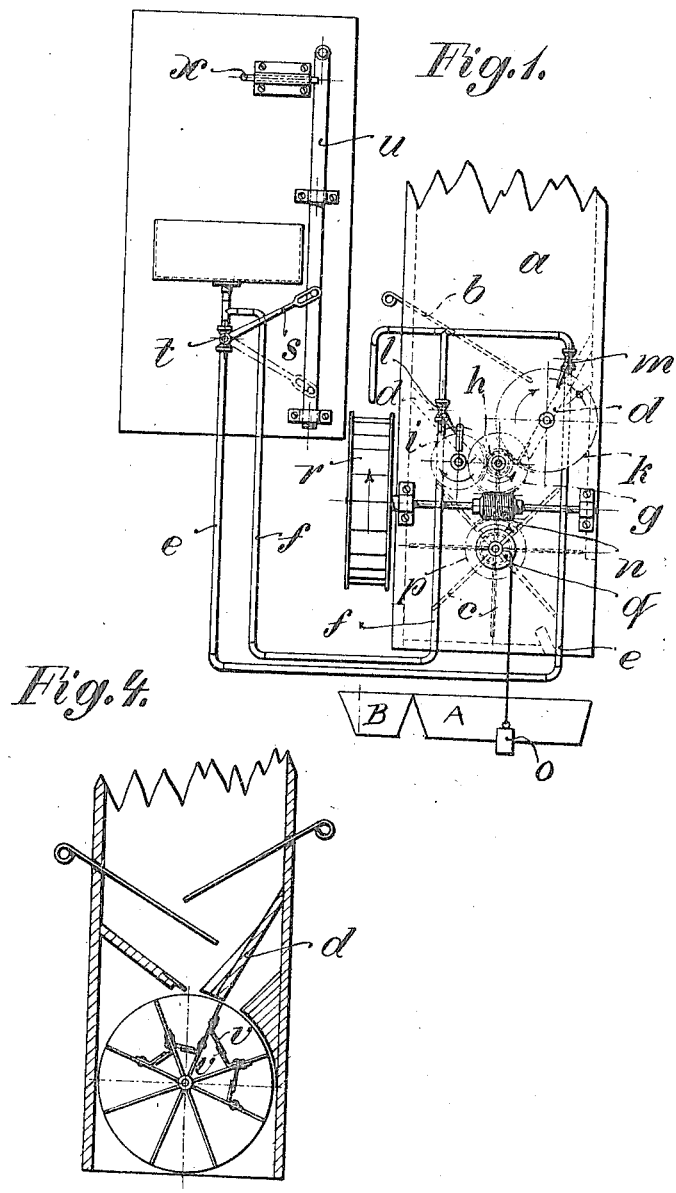

H. KUXMANN.
AUTOMATIC FOOD AND WATER SUPPLY.
APPLICATION FILED OCT. 28, 1912.
1,207,938.
Patented Dec. 12, 1916.
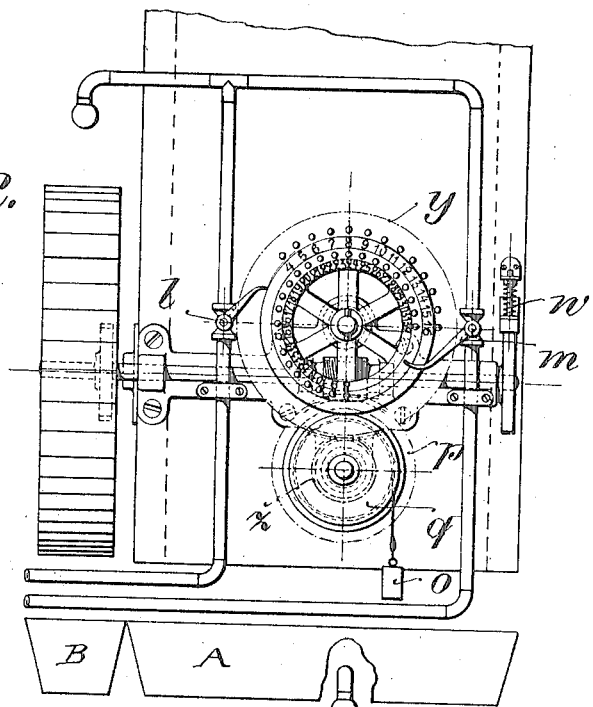
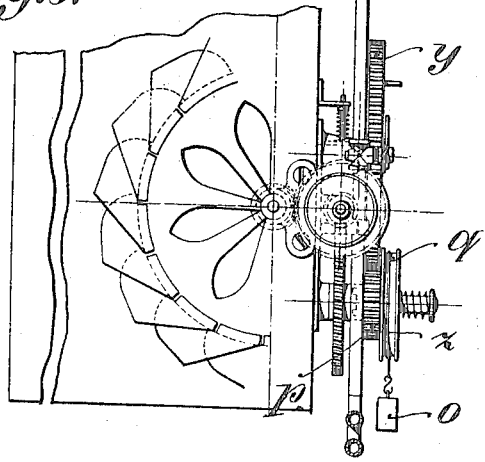

UNITED STATES PATENT OFFICE.

HEINRICH KUXMANN, OF BIELEFELD, GERMANY.

AUTOMATIC FOOD AND WATER SUPPLY.

1,207,938.  Specification of Letters Patent.  Patented Dec. 12, 1916.

Application filed October 28, 1912. Serial No. 728,160.

*To all whom it may concern:*

Be it known that I, HEINRICH KUXMANN, a subject of the King of Prussia, and resident of Bielefeld, in the Province of Westphalia, Kingdom of Prussia, German Empire, have invented certain new and useful Improvements in Automatic Food and Water Supplies, of which the following is a specification.

This invention relates to an automatic apparatus for the supply of food and drinks for cattle, in which a drum containing the fodder is revolved by a water wheel and thereby gradually discharged into the feeding trough A, while at the same time the water is delivered into the drinking trough B. In such constructions as hitherto known there was nevertheless largely requisite special service and supervision. For instance, after each feeding, the fodder drum must be refilled and the apparatus for opening of the water supply for the driving of the water wheel must be readjusted, moreover the operation of the drum required control because certain mixtures of fodder were liable to hinder the motion of the drum by straws or the like, without the possibility of these interruptions being able to be overcome by the slight water power alone. In order in this direction to be able to reduce the necessary service and control to the minimum degree, according to this invention there is arranged above the feeding drum a fodder receptacle of usual pattern which is so constructed that it can supply automatically several fillings without difficulty. The special construction of the fodder receptacle consists in the feature that above two sloping bottoms which serve to limit the size of the outlet, there is provided a still further sloping bottom plate, which takes up the pressure of the fodder supply and directs a small and slowly descending quantity of fodder to the sloping plate, which borders upon the outlet opening. In consequence of this construction the feeding is not limited by the emptying of the drum and therefore, there is provided in the pipe of the actuating water which serves at the same time as drinking water, a closing device, which is closed by means of a mechanism dependent upon the rotation of the drum, after this has effected a certain amount of turning. In spite of this arrangement, however, it would frequently be necessary to wait the end of each feeding delivery in order to undertake the adjustment for the next feed, inasmuch as the morning and the evening feed may have to be proportioned differently were it not that by this invention by means of a double water supply, a separate actuation can be obtained for each of these two feeding times. The one pipe serves for the morning feed, whereas the other pipe serves for the evening feed, and may also be adapted for the mid-day feeding. By means of this device it is attained that the adjustment for the morning feed can be effected at the same time as that for the evening feed. The uniform and uninterrupted operation of the feeding drum for various mixtures of fodder is moreover attained by the arrangement that, upon the shaft of the drum driven by a worm wheel gear in the direction of rotation, there is inserted a weight, which supports the action of the worm wheel gearing if resistances occur, or acts as a check whenever the drum revolves too easily. Moreover, in special constructional arrangements means are provided which influence the motion of the drum favorably. These means are intended to simplify the adjustment and the motion of the drum for the morning and the evening feed respectively, and to make possible an alteration of the contents of the drum boxes, and also the speed of delivery of the drum rotation, and finally, to facilitate the action of the drum.

The invention is illustrated in the drawing as follows:—

Figure 1 shows a side elevation of the feeding device which is without the last described devices designed to influence favorably the action of the drum. Fig. 2, illustrates one of these special devices and moreover, that one which serves for the adjustment for the morning and evening feeding in elevation, and Fig. 3 shows the same device in elevation at right angles to that shown in Fig. 2, part of the water wheel being broken away. Fig. 4 shows in longitudinal section through the drum and the adjacent part of the fodder container, the device assisting the alteration of the contents of the drum boxes and also facilitating the action of the drum itself.

Referring first to the construction illustrated in Fig. 1. The water wheel $r$ rotates the feeding drum $c$ by means of a worm gear. From this drum the fodder is delivered to the manger in separate, exactly measured quantities. Upon the fodder drum is placed the container $a$ which may be of any desired height. In the container are arranged the sloping partitions $d$ which serve to guide the contents of the fodder receptacle gradually into the cellular drum serving to distribute the same. Above these partitions $d$ there are moreover other sloping partitions $b$, which are adjustable. Further, the width of the slot between the partition $b$, and the partition $d$, can be changed. By this arrangement of these three partitions the passage ways cannot become choked or the food supply be interrupted because the varying speeds of the separate fodder mixtures can be taken into account. Moreover it is found that the weight of the contents of the container cannot press upon the cellular drum so that any braking on the rotation of this drum is prevented.

From the water receptacle $h'$ two pipes $e$ and $f$ pass to the entrance of the water inlet. Of these pipes $e$ serves for the morning feed and $f$ for the evening and afternoon feed. By means of a clockwork (not illustrated) the bolt $x$ can be withdrawn at the requisite time, so that the bar $u$ which is up to that time held fast by it, falls down. By means of the bar $u$ and the lever $s$, the tap $t$ can be controlled, which tap is inserted in the tube $e$. The movement of these rods, and consequently the actuation of the device for the morning feed, is effected by means of a clockwork which is set in action on the previous day at the same time as the evening feed. The conclusion to the morning feed is effected by the closing of the tap $m$ which closes the water pipe at the required time, so that the drum also stands still. For this purpose, there are arranged on the feeding device the gear wheels $g$, $h$ and $k$, which are driven by means of the worm $n$. Upon the wheel $k$ there is fixed a pin, which during its motion strikes against a lever of the tap $m$ and closes it. At noon and evening, the tap $l$ in the pipe $f$ is opened by hand in order to set the apparatus going. The closing of this tap at the end of the feeding time is effected by the gear wheel $i$, which is actuated by the worm, operating the wheels $g$ and $h$, which wheels are rigidly fastened together and mounted on the same shaft. On this wheel $i$ is placed a projecting pin which actuates the tap $l$. The closing of the taps $l$ and $m$ by means of the wheels $i$ and $k$ takes place sooner or later according as a smaller or greater number of teeth are traversed on the spur wheel $h$ connected with the worm wheel $g$. In order to adjust this number according to need, the wheels can be taken off their pivots and be adjusted. The wheel $k$ for the morning feed must in this case have a much greater number of teeth than the wheel $i$, because during the evening feeding it advances by that number of teeth to which the wheel $i$ is adjusted for the closing of the tap $l$. In order correctly to measure the morning feeding, the wheel $k$ must therefore be adjusted back on the evening previous until there will remain after the rotation takes place during the evening feeding, still a requisite number of teeth for the rotation during the next morning feed. There are preferably provided on the wheels, marks and numbers, which correspond to the number of the cells of the feeding drum which are to be emptied. This number can of course be a larger one if the drum possesses a sufficient number of cells, because the operator has the power through the wheels $l$ and $k$ to make the drum effect more than one revolution. The worm $n$ drives the feeding drum $c$ through the wheel $p$. Besides this wheel $p$ there is keyed upon the feed drum shaft a wheel $q$ about which is placed a cord or the like, from which a weight $o$ is suspended. This weight acts compensatingly upon the drum motion inasmuch as it assists the worm gear drive in the overcoming of greater resistances caused by the jamming of straws or other similar difficulties, and in the case of a too easy motion it causes the friction between the worm wheel and the worm which acts like a brake.

It should moreover be noticed that the worm can act upon the worm wheel but that the worm wheel cannot react on the worm to turn it backward, because the worm gear is too flat for this purpose. If, therefore, the drum moves too easily the weight still seeks to turn the drum, but by this means the surfaces of the worm wheel teeth which do not ordinarily operate, are pressed upon those surfaces of the worm which also do not operate, and this without permitting the rotation of the worm to be increased thereby. On the contrary, there is occasioned between these opposed surfaces a friction which is to be overcome by the worm and which consequently delays its turning and therefore the turning of the drum. The drum then rotates only under the influence of the weight of the one-sided food load, while the worm acts as a uniformly yielding brake. The greater the resistance of the drum becomes, the less becomes the friction between the opposed surfaces and the worm gearing. On the attainment of a cetrain degree of resistance, this friction disappears and the ordinary working surfaces of the worm gear come again into contact so that the worm then acts rotatively, and the resistance to be overcome is diminished by the weight $o$. From this it will be obvious that throughout the weight $o$ has a compensating action.

In Figs. 2 and 3 is illustrated a modification for the adjustment for the morning and evening feed and the following is to be noticed: Upon the drum shaft is fixed a little gear wheel $z$ with the rope wheel $q$ already described in the preferred form, which wheel is connected by means of a coupling with the likewise already described gear wheel $p$. The wheel $z$ engages in gear wheel $y$ which serves for shutting off the water and in which are two concentrically arranged rows of holes. For each row of holes there is provided a locking pin, which can be inserted at will in any one of the holes and which serves to shut the tap $l$ or the tap $m$. The inner row of holes is destined for the morning feeding and the outer row of holes for the noonday and evening feeding. The figures placed in the vicinity of the holes indicate the total number of cells to be emptied for the morning or for the evening feeding. The adjustment is effected in such a manner that by means of the cord wheel $q$ the little gear wheel $z$ is drawn out of the coupling, so that the locking wheel is free and can be adjusted. The locking pin is then screwed into the hole which corresponds to the number of the drum cells which it is intended to use for the feeding. At the same time the weight $o$ is drawn up. In order to regulate the time of the feeding there is provided an adjustable spring brake $w$ adapted to regulate the movement of the worm shaft.

In Fig. 4 which illustrates a section through the drum and the adjacent part of the fodder container may be seen the device which serves to alter the contents of the drum cells. In each cell are placed two plates $v$ radially displaceable and engaging one over another. The displacement can be effected by having radial flanges on these plates adjustably fixed to the cell walls. Whether the means of adjustment are screws adjustable in radial slots or placed in setting holes, or whether the adjustment to various positions is effected in any other way is of no importance in the invention. The nearer the plates $v$ are to the drum axis the more they overlap each other and the more feed the cell holds. Hereby is attained the possibility of being able to supply various quantities of food according to requirement while the number of rotations of the drum remains constant. Finally, there may be seen in Fig. 4 the arrangement which is devised to assist the motion of the feeding drum. The sloping plate $d$ which is on the right is so shaped at its under part that its lower edge somewhat recedes toward the middle. This has the result that the cell walls at the edge of this sloping plate $d$ do not pass all at once over the whole extent but gradually slip past it. This arrangement facilitates the action of the drum very considerably.

Having now particularly described and ascertained the nature of my said invention and in what manner the same is to be performed, I declare that what I claim is:

1. An automatic food and water supply comprising a rotatable drum containing food and which delivers food to a feed receptacle, a water wheel, a shaft to which said water wheel is fastened, a worm on said shaft, said worm operatively connected with the drum to rotate it, a pipe conducting water to said water wheel to operate it, said water after operating the water wheel being delivered to a drinking trough, a valve in said pipe, a handle for said valve, a wheel operatively connected with said drum to be rotated thereby, and a projection on the wheel adapted by the rotation of the wheel to be brought into contact with the handle of the valve to close the valve and shut off the water supply.

2. An automatic food and water supply comprising a food holding drum a water wheel operatively turning said drum, a shaft on which said water wheel is mounted, a worm mounted on said shaft, a gear wheel meshing with said worm and turning said drum, valved water delivery pipes, a gear wheel operatively connected to said worm, a pin on said last mentioned gear wheel, means adapted to be engaged by the pin to operate the valves and a spring brake on the shaft of said drum, for the purpose specified.

In testimony whereof I have signed my name to this specification in the presence of two subscribing witnesses.

HEINRICH KUXMANN.

Witnesses:
 H. J. RUNGE,
 J. KAUFFMAN.

Copies of this patent may be obtained for five cents each, by addressing the "Commissioner of Patents, Washington, D. C."